US009727703B2

(12) United States Patent
Clement

(10) Patent No.: US 9,727,703 B2
(45) Date of Patent: *Aug. 8, 2017

(54) SOFTWARE DISTRIBUTION METHOD AND APPARATUS

(75) Inventor: Kurt Clement, Sioux City, IA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 989 days.

This patent is subject to a terminal disclaimer.

(21) Appl. No.: 13/227,730

(22) Filed: Sep. 8, 2011

(65) Prior Publication Data
US 2011/0320311 A1    Dec. 29, 2011

Related U.S. Application Data

(63) Continuation of application No. 11/501,213, filed on Aug. 7, 2006, now Pat. No. 8,099,366, which is a continuation of application No. 09/518,787, filed on Mar. 3, 2000, now Pat. No. 7,103,598.

(51) Int. Cl.
G06F 21/10     (2013.01)
G06F 21/12     (2013.01)
G06Q 30/06     (2012.01)
G06Q 40/00     (2012.01)

(52) U.S. Cl.
CPC .............. *G06F 21/10* (2013.01); *G06F 21/12* (2013.01); *G06Q 30/0609* (2013.01); *G06Q 40/12* (2013.12); *Y10S 707/99933* (2013.01); *Y10S 707/99943* (2013.01)

(58) Field of Classification Search
USPC ..................................................... 705/51, 59
See application file for complete search history.

(56) References Cited

U.S. PATENT DOCUMENTS

| | | | |
|---|---|---|---|
| 5,337,357 A * | 8/1994 | Chou et al. ..................... 705/56 |
| 5,438,508 A | 8/1995 | Wyman | |
| 5,490,216 A * | 2/1996 | Richardson, III .............. 705/59 |
| 5,553,143 A * | 9/1996 | Ross et al. ...................... 705/59 |
| 5,588,146 A | 12/1996 | Leroux | |
| 5,671,362 A | 9/1997 | Cowe et al. | |
| 5,712,989 A | 1/1998 | Johnson et al. | |
| 5,717,930 A * | 2/1998 | Imai ......................... G06F 8/61 713/1 |
| 5,754,864 A * | 5/1998 | Hill ................................ 717/173 |
| 5,758,068 A * | 5/1998 | Brandt et al. ................... 726/27 |
| 5,761,651 A | 6/1998 | Hasebe et al. | |
| 5,790,664 A * | 8/1998 | Coley et al. .................. 709/203 |

(Continued)

OTHER PUBLICATIONS

Digital Square, Inc., The PC Commerce Company, Apr. 6, 2000, <http://www.digitalsquare.com/index.html>.

(Continued)

*Primary Examiner* — Tsan-Yu J Huang
(74) *Attorney, Agent, or Firm* — Gazdzinski & Associates, PC

(57) ABSTRACT

The present invention provides for a method and apparatus for distributing digital information, such as software applications, to application users. By providing the digital information on unused memory space of a computer system, and providing a process for authorizing access to the information, the information can be efficiently and cost effectively transferred to users. Traditional inventory and distribution channel difficulties are avoided.

41 Claims, 3 Drawing Sheets

(56) References Cited

U.S. PATENT DOCUMENTS

| | | | |
|---|---|---|---|
| 5,864,620 A * | 1/1999 | Pettitt | 705/54 |
| 5,893,910 A * | 4/1999 | Martineau et al. | |
| 5,898,780 A * | 4/1999 | Liu et al. | 713/155 |
| 5,905,860 A * | 5/1999 | Olsen et al. | 726/27 |
| 5,912,818 A | 6/1999 | McGrady et al. | |
| 5,940,504 A * | 8/1999 | Griswold | 705/59 |
| 5,982,889 A * | 11/1999 | DeMont | 705/51 |
| 6,044,471 A * | 3/2000 | Colvin | 726/28 |
| 6,169,976 B1 * | 1/2001 | Colosso | 705/59 |
| 6,195,432 B1 * | 2/2001 | Takahashi et al. | 380/277 |
| 6,226,618 B1 * | 5/2001 | Downs | G06F 21/10 380/279 |
| 6,233,567 B1 * | 5/2001 | Cohen | G06F 21/10 705/59 |
| 6,298,341 B1 * | 10/2001 | Mann et al. | |
| 6,301,666 B1 * | 10/2001 | Rive | 726/27 |
| 6,317,878 B1 * | 11/2001 | Saito | 717/168 |
| 6,442,696 B1 * | 8/2002 | Wray et al. | 726/5 |
| 6,468,160 B2 * | 10/2002 | Eliott | 463/43 |
| 6,564,247 B1 * | 5/2003 | Todorov | 709/206 |
| 6,578,199 B1 * | 6/2003 | Tsou et al. | 717/178 |
| 6,581,044 B1 * | 6/2003 | Alur | 705/59 |
| 6,599,194 B1 * | 7/2003 | Smith et al. | 463/30 |
| 6,712,704 B2 * | 3/2004 | Eliott | 463/43 |
| 6,732,106 B2 * | 5/2004 | Okamoto et al. | 707/784 |
| 6,769,989 B2 * | 8/2004 | Smith et al. | 463/41 |
| 6,829,593 B1 * | 12/2004 | Ritter et al. | 705/51 |
| 6,876,984 B2 * | 4/2005 | Tadayon et al. | 705/51 |
| 6,882,979 B1 * | 4/2005 | Reay et al. | 705/26.41 |
| 6,915,275 B2 * | 7/2005 | Banerjee et al. | 705/26.5 |
| 6,942,573 B2 * | 9/2005 | Elliott | 463/29 |
| 6,963,846 B1 * | 11/2005 | Kelly et al. | 705/346 |
| 6,965,877 B2 * | 11/2005 | Banerjee et al. | 705/37 |
| 7,103,598 B1 | 9/2006 | Clement | |
| 2002/0007456 A1 * | 1/2002 | Peinado | G06F 21/10 713/164 |
| 2011/0320311 A1 * | 12/2011 | Clement | G06F 21/10 705/26.35 |

OTHER PUBLICATIONS

Digital Square, Inc., Your Personal Software Store—24 Hours a Day!, Apr. 6, 2000 , <http://www.digitalsquare.com/index.html>.
Digital Square, Inc., Our System, Apr. 6, 2000. <http://www.digitalsquare.com/index.html>.
Pros & Cons: Digital Video Express (DIVX), May 3, 1999, http://www.hom.net/7%Ewayneb/pros-cons-divx.htm.
America Online, Inc. Free AOL!, Installation Instructions, Jan. 14, 2000, <http:www.free.aol.com/trya . . . >.
Adobe Systems Incorporated, Adobe Type on Call, Feb. 1, 2000, http://www.adobe.com/store/products/typeoncall.html.
America Online, Inc., AOL.COM Copyright, Jan. 14, 2000, <http:www. aol.com/copyright.html>.

* cited by examiner

SOFTWARE DISTRIBUTION METHOD AND APPARATUS

PRIORITY AND CROSS-REFERENCE TO RELATED APPLICATIONS

This application is a continuation of and claims priority to U.S. patent application Ser. No. 11/501,213, filed Aug. 7, 2006 and entitled "SOFTWARE DISTRIBUTION METHOD AND APPARATUS", which is a continuation of U.S. patent application Ser. No. 09/518,787 of the same title filed Mar. 3, 2000, now U.S. Pat. No. 7,103,598 issued Sep. 5, 2006, each of the foregoing being incorporated herein by reference in its entirety.

TECHNICAL FIELD

The present invention is directed toward a method and apparatus for providing digital data, such as software applications, to users. More specifically, the method and apparatus eliminate conventional inventory and distribution inefficiencies by transmitting digital data, along with means for activating that data, as part of originally manufactured computer systems.

BACKGROUND OF THE INVENTION

Maintenance of inventory has long been a costly and unfortunate reality of providing products to downstream users such as resellers or customers. In order to have products on hand for use, a supplier must either maintain a large enough inventory of products to meet any use requirements, or be able to very accurately predict use requirements and control supplies at the predicted use rate. A key variable, and one often disputed among buyers and sellers in a supply chain, is who will maintain ownership of a product at different points along the supply chain. The owner of a product bears the obvious cost of the time value of money of the product for as long as the product is owned.

A product supplier sometimes uses offers to maintain ownership of a product until actual time of purchase by an end user as an incentive to convince end sellers to carry the products of the product supplier. Traditionally, this is well known as consignment sales. Consignment sales and highly accurate inventory management, e.g. just-in-time inventory management, are illustrated in the prior art with regard to product distribution in U.S. Pat. Nos. 5,912,818, 5,712,989, and 5,671,362. As the economy has moved from a physical product distribution system to a system that includes distribution of information and information products, inventory issues have also changed.

Many products of the modern economy are in fact information or digital data products. Examples include computer applications software, computer data files, analog and digital artistic and informational recordings, and the like. A distinct advantage enjoyed by information products over physical products is that information products can be stored with a minimal physical presence. For instance, the product may be stored on a recording media. However, under traditional models of distribution, information products are copied onto multiple physical media and to subsequently distributed just like any other physical product. Another option for information products is to transfer or download an electronic copy of the information over a network such as a local or wide area network, or the Internet. Such transfers, especially with regard to transfer over the Internet, are typically slower than is convenient because of the relatively low bandwidth of the network. Long transfer time is a negative factor that potentially discourages an end user from using an information product.

One recent product that was introduced on a pay-as-you-use basis was Digital Video Express (DIVX). However, with DIVX a customer had to both buy digital media and pay a license fee each time the content of the media was accessed. This model did not prove commercially viable and new DIVX disks are no longer being sold. A significant problem with DIVX was the need to both buy the media and pay for its use.

ADOBE SYSTEMS, INC. has sold a product entitled "Type on Call." Type on Call stores many fonts on a CD-ROM. The CD-ROM is distributed to users who then must contact and pay ADOBE in order to receive an access code needed to activate one or more of the fonts. This art is disadvantageous because traditional distribution channels must still be used, and because a user must intervene and request an access code rather than having the computer system automatically control access.

The email, network, and Internet service provider AMERICA ONLINE, INC. (AOL) has used various methods to distribute its access software. AOL sometimes directly distributes free media containing its access software, and subsequently charges consumers for access to its connections and network. However, the software itself is not the value provided to the customer. The associated service is the value. The software is provided free of change and "as is." A downside of the AOL model is that it still requires traditional distribution of media or a relatively slow download. Additionally, because there is no value assigned to the software itself, access to the software is not controlled. The access control is with regard to the associated service.

An improved system would conveniently provide digital data to an end user quickly and with little effort so that the user would be encouraged to use the data. Supply of the data in an improved system would avoid traditional distribution channels as well as physical inventory, thereby reducing costs to all parties. An improved system would also activate automatically in response to access to the digital data and would verify access rights of a user or provide the user with options to activate access rights. Improved systems could also take advantage of unused space in a computer system's nonvolatile memory space to cost effectively record data for subsequent transfer.

SUMMARY OF THE INVENTION

An embodiment of the invention is a method of distributing software with a computer system to a user. An act of the embodiment is to record data on a fixed medium in the computer system. Another act is to provide for transfer of the computer system to the user. Additionally, access to the data is controlled through computer executable code that requires authorization for continued access to the data.

Another embodiment of the invention is a software module used in a computer system operable to provide controlled access to a software application being stored on a fixed medium in the computer system and being distributed with the computer system. The software module of the embodiment detects use of the software application on the computer system, and verifies authority to access the software application.

Still another embodiment of the invention is a computer system operable to provide controlled access to a software application stored on a fixed medium in the computer system and distributed with the computer system. The embodiment may include a processor, a memory coupled to the processor, and a software module executable on the processor and the memory. The software module is responsive to the activation of the software application. The software module verifies authority to access the software application. If authority is verified, then uninterrupted access to the software application is allowed. If authority is not verified, then access to the software application is interrupted.

DETAILED DESCRIPTION OF THE INVENTION

Figure 1:
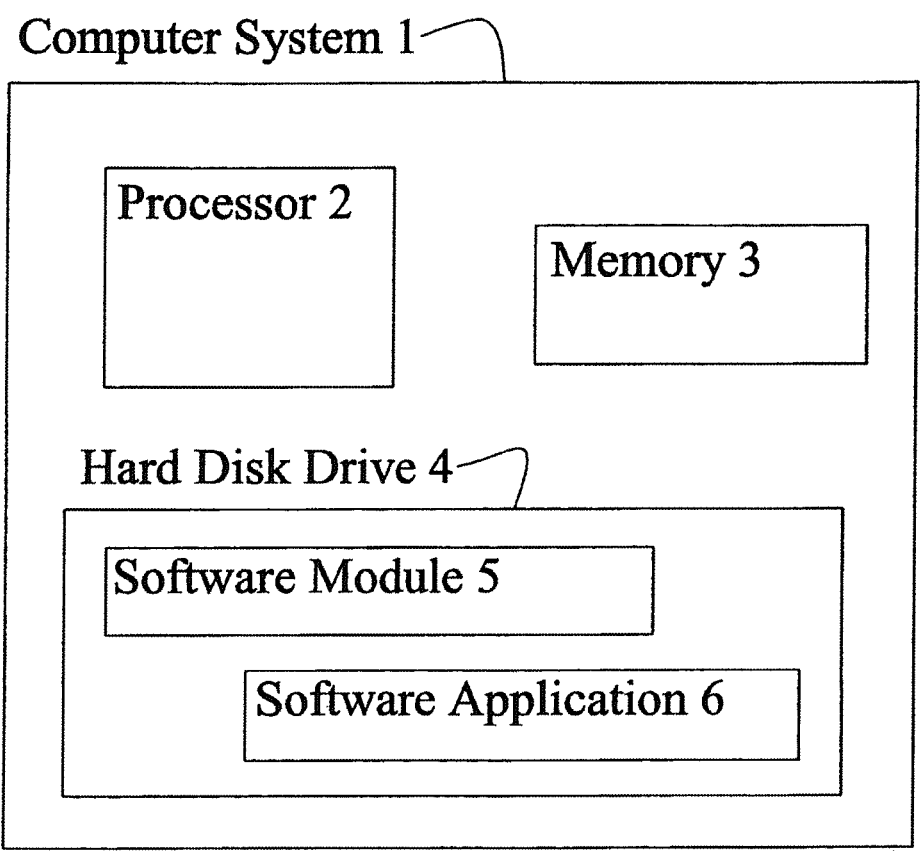
FIG. 1 is a functional block diagram of a computer system of an embodiment of the invention.

Embodiments of the present invention are directed toward a computer system 1 as illustrated in FIG. 1. The computer system 1 can be any of a number of computer systems capable of carrying out computer executable code. The computer system may be, for example, an INTERNATIONAL BUSINESS MACHINES, INC. type personal computer, or IBM clone, an APPLE COMPUTER, INC. machine, a mainframe or network host computer, a personal digital assistant (PDA) or handheld, or any other computing device having the capacity to process computer executable code.

The computer system 1 illustrated also includes a processor 2. The processor 2 may be an INTEL CORPORATION or equivalent personal computer processor, SPARC processor, ALPHA processor, MIPS processor, or a processor specialized to execute instructions in any of the computer systems as exemplified above. Similarly, the memory 3 may be system or subsystem memory of any variety that couples to the processor 2 to store programs and/or data in the computer system 1. Example types of useable memory include dynamic random access memory and programmable read only memory, as well as other types of memory as are commonly used in computer systems.

The computer system 1 illustrated in FIG. 1 also includes a hard disk drive 4 that provides nonvolatile storage for the system. The hard disk drive 4 would be classified as a "fixed medium" in a computer system. A fixed medium is generally distinguishable from a removable media storage device in that the media, or physical part of the device on which information is stored, typically remains in the drive of the device. Examples of removable media are CD-ROM disks, floppy disks, DVD disks, and magnetic tapes. Among other information, the hard disk drive 4 may store a software module 5 and at least one software application 6. Embodiments of the computer system 1 are operable to provide controlled access to the software application 6 stored on the hard disk drive 4. As will be discussed in further detail below, the software application 6 may be placed on and distributed with the hard disk drive 4 during the manufacturing process. Access control may be provided by the software module 5.

The software module 5 may be executable on the processor 2 and the memory 3. The software module 5 is responsive to activation of the software application 6 on the computer system 1. That is, some embodiments of the invention are capable of detecting use of the software application 6 and acting on that detection. Upon detection, the software module 5 acts to verify authority to access the software application 6.

Figure 2:
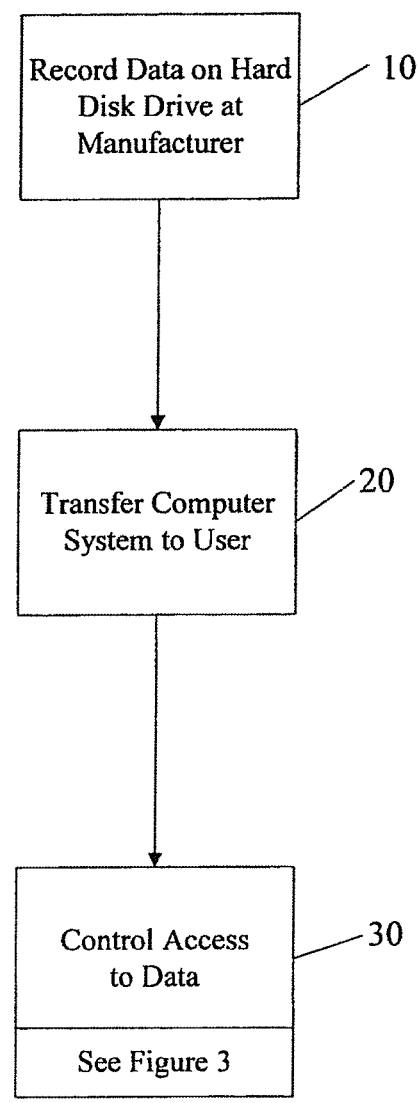
FIG. 2 is a flowchart illustrating acts of an embodiment of the invention.

FIG. 2 illustrates a method of distributing software in accordance with an embodiment of the invention. As shown in the first action, block 10, data is recorded on a fixed medium such as a hard disk drive at the manufacturer. In addition to a hard disk drive, the fixed medium could be another type of nonvolatile storage device as is known in the art of computer system manufacture. For instance, the fixed medium could be a fixed optical disk, a programmable read-only memory, or some other such device capable of storing information in a nonvolatile way. The data that is recorded on the fixed medium may include both software application program instructions and the instructions of the software module. In some embodiments, the software application program instructions enable a software application that does not depend on continued access to a network for fully functional operation. In other words, the software application of these embodiments is a traditional software application such as a word processing application, spreadsheet application, a gaming application, or some other application that does not require continued access to a network. Examples of software applications requiring continued access to a network for full functionality are: Internet or network access applications, multi-player interactive Web based games, and hosted application software. Without a continuing connection to a network, the second set of applications are not enabled to perform their full range of functions. For instance, a Web browser could open and read a PEG file from a computer system's hard disk drive without a connection to a network, but could not read a JPEG file from an external Web page. Embodiments of the present invention, on the other hand, are capable of continuing fully functional use after only a brief authorizing act via a network.

In a second act, block 20, a computer system is transferred to a user. The user may be an end-user, such as a consumer, or the user could be a reseller. Transfer of the computer system to a user could be by any delivery means, including conventional means as are well known in the art.

Figure 3:
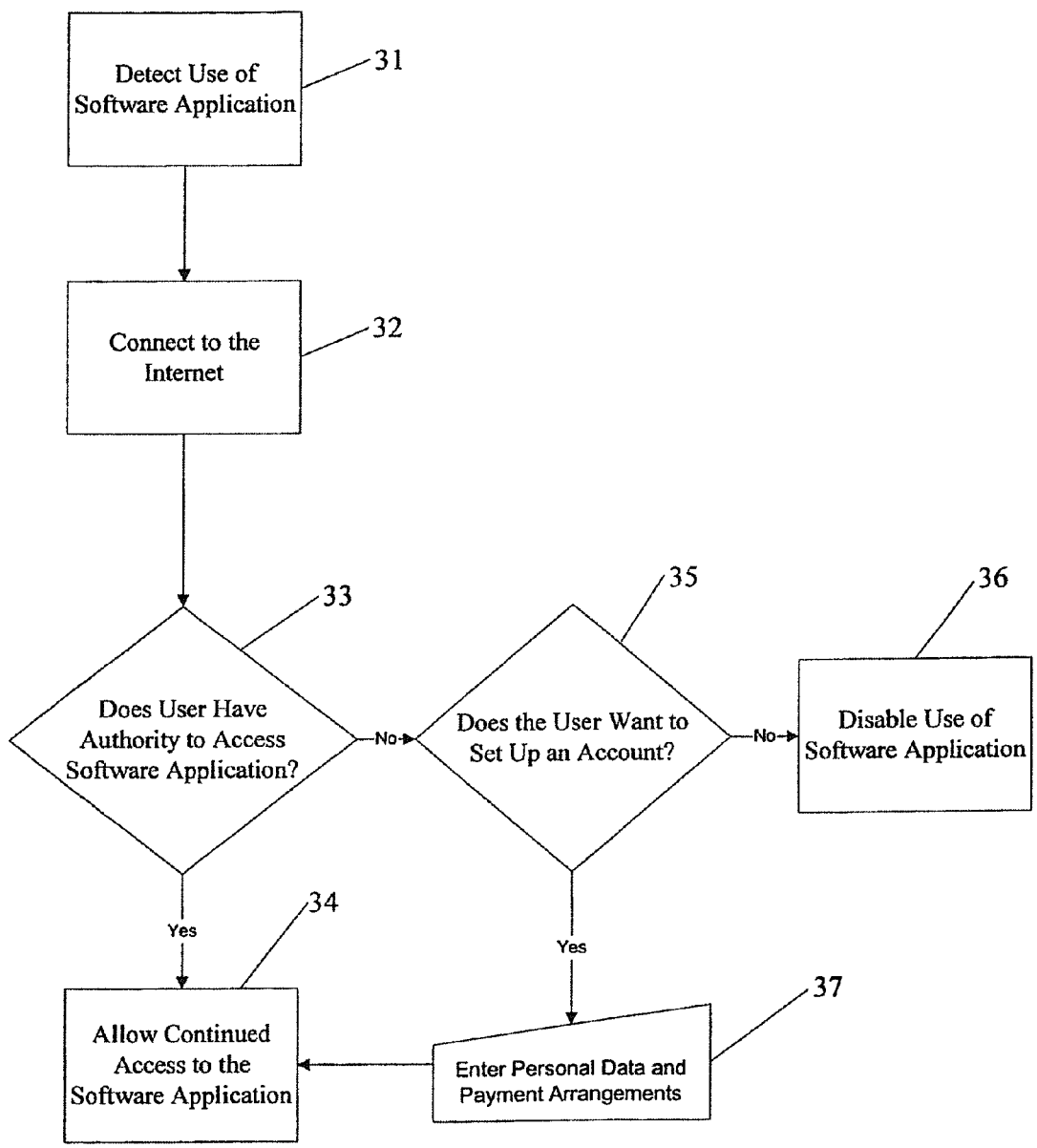
FIG. 3 is a flowchart illustrating more specific acts of embodiments illustrated in FIG. 2.

By the act of block 30, access to the data is controlled through the execution of computer code that implements authorization procedures. The executable computer code may be the code of the software module 5 of FIG. 1 as discussed above. As illustrated in FIG. 3, controlling or verifying rights to access the data, a software application in this case, may be accomplished by first detecting use of the software application, block 31. The software module may be configured to verify authority to access a software application either by verifying the access, permissions of a particular user or by verifying access permissions of a particular accessing computer system. The right to access a software application may be automatically checked when an attempt is made to access the software application. As illustrated in block 32 of FIG. 3, the means by which access is checked is the Internet. Therefore, when the software application is accessed, the code of the software module automatically makes a connection to the Internet and presents a query to a party authorized to grant access to the software application. In some systems, a network link other than a link to the Internet is made in the process of granting access to data such as the software application.

Once a link is established with a party authorized to grant access to the data, the software module must interact with the authorizing party to determine a user's access authority. See block 33 of FIG. 3. In some cases, the software module will interact with the authorizing party to determine if a particular computer system, rather than a particular user, is authorized to access the data. The authorization process would include the basic steps of identifying the accessed data, identifying the accessing user or computer system, and comparing the user or computer system with those authorized to access the data. The response to this query would be recorded in the software module, or in a location the software module could query. Therefore, if a user or system has authority to access the data, the user or system is allowed to continue access to the data, as illustrated in block 34. However, if the user or system is not authorized, access to the data may be interrupted, or the function of the data may be disabled. Alternatively, the user may be presented with an opportunity to set up an account so that future access to the data will be granted. In the circumstance where a user or computer system already has an account, the act of block 33 would be determined by checking whether the user or system had sufficient account credit continue access to the data. Also, rather than inactivating access to data for insufficient account credit, users or systems with adequate qualifications could simply be billed for accessing the data regardless of the account balance.

As illustrated in block 35 of FIG. 3, a user that does not have authority to access the data may be given the opportunity to set up an account and thereby gain access to the data. If the user does not wish to set up an account, the users ability to access the data may be disabled, block 36. Alternatively, if the user does want to set up an account for continued access to the data, the user will be asked to input personal data and make payment arrangements, block 37. Successful entry of adequate personal data and payment arrangements leads to continued access to the data, block 34. Unsuccessful entry may lead to the disabling of access to the data, as was noted in block 36.

ADVANTAGES OF THE INVENTION

Embodiments of the invention provide digital data, such as computer application software, to an end user quickly and with little required effort by the user. The user is therefore encouraged to "impulse buy" access to a software application that the user might otherwise forego. Specifically, if a user developed a data processing need during the period of ownership of a computer system, it would be a significant convenience for the user to merely activate a software application that met that need. Once activated the user would merely allow the system to automatically establish or assist in establishing the user's access permissions. Compared with the traditional process of traveling to a retail outlet to buy a software application, mail ordering a software application that must be both inventoried and delivered, or going through the relatively long process of downloading the software application, embodiments of the invention provide significant advances to the state of the art.

Additionally, because embodiments of the present invention provide for delivery of digital data on a fixed medium in an originally manufactured computer system, there is absolutely no additional shipping or inventory cost associated with the delivery of the data.

Most computer systems ship with significant amounts of free digital storage space that typically is not employed by a user until a significant amount of time has passed. Therefore, inclusion of data such as software applications on the free digital storage space is an efficient and valuable contribution to the state of the art. When the balance of free digital storage space is consumed, a user can simply delete the digital data provided with the computer system.

From the foregoing it will be appreciated that, although specific embodiments of the invention have been described herein for purposes of illustration, various modifications may be made without deviating from the spirit and scope of the invention. Accordingly, the invention is not limited except as by the claims.

What is claimed is:

1. A method of controlling access to a proprietary software application resident on a new computerized apparatus sold to a purchaser, the method comprising:
   receiving an initial request from the purchaser via an input device of the apparatus to execute the application;
   automatically accessing a remote third party authorization entity via a network interface of the computerized apparatus in order to obtain an authorization for the initially requested execution of the application;
   recording information relating to the obtained authorization on the computerized apparatus for subsequent use;
   accessing the application pursuant to the initial request using at least the authorization;
   receiving a subsequent request to execute the application from the purchaser; and
   granting access to the application pursuant to the subsequent request based at least in part on the recorded information and without having to contact said third party again.

2. A computer-implemented method of controlling access to digital data in a computer apparatus, the data having been recorded on a non-volatile storage device of the computer apparatus, the method comprising:
   recording in the computer apparatus a plurality of computer readable instructions, the instructions configured to, when executed by the computer apparatus, control access to the digital data by at least:
      based at least in part on receiving a first request for access to the digital data from a first entity, causing the computer apparatus to contact a party authorized to grant access to the digital data when the digital data has not been previously accessed;
      receiving authorization to grant access to the digital data;
      causing the computer apparatus to record at least a portion of the received authorization in the computerized apparatus, and grant access to the digital data based at least in part on the authorization; and
      in response to receiving at least a second request for access to the digital data, cause the computer apparatus to grant another access to the digital data based on the at least portion of the authorization recorded in the computer apparatus, and without further contact with the party.

3. The method of claim 2, wherein said recordation of the digital data is performed at a time of manufacture or sale of the computer apparatus.

4. The method of claim 3, wherein said first entity comprises a first user of said computer apparatus and said second request is by a second user that is different than the first user.

5. The method of claim 3, wherein said second request is made by the first entity.

6. The method of claim 2, wherein:
   said contact with the party authorized to grant access to the digital data comprises transmission of at least a portion of the digital data recorded on the computer apparatus to the party; and said recordation of the digital data is based at least in part on a purchase request for the computer apparatus.

7. The method of claim 2, wherein:
the digital data comprises a software application; and
said recordation of the digital data is performed based at least in part on a sale of the software application.

8. The method of claim 7, wherein said first entity comprises a first user of said computer apparatus and said second request is by a second user of said computer apparatus, said second user being different from said first user.

9. The method of claim 7, wherein said first entity comprises a first user of said computer apparatus and said second request is made by the first user.

10. The method of claim 7, wherein said control of access to the digital data further comprises causing verification of a permission of the computer apparatus to access the software application.

11. The method of claim 7, wherein said contacting the party comprises contacting a computer system remote from the computer apparatus via a data network.

12. The method of claim 2, wherein said grant of access to the digital data based at least in part on the authorization comprises granting access to the digital data based on the recorded authorization.

13. The method of claim 2, further comprising causing presentation at the computer apparatus of an opportunity to qualify for access to the digital data when the party does not provide authorization to grant access to the digital data.

14. The method of claim 13, wherein said opportunity to qualify for access to the digital data comprises establishment of an account associated with a first user, the establishment of the account configured at least in part to effect granting of access to the digital data.

15. The method of claim 14, wherein said opportunity to qualify for access to the digital data comprises billing a user for the granting of access to the digital data.

16. A method of distributing software with a computerized apparatus having digital data recorded thereon, the method comprising:
recording computer readable instructions in the computerized apparatus, the instructions configured to, when executed by the computerized apparatus, automatically control access to the digital data by at least:
based at least in part on a first request for access to the digital data, executing the computer readable instructions causing the computerized apparatus to contact a party authorized to grant access to the digital data, the contact comprising transmission of at least a portion of the digital data; and
when the party provides authorization to grant access to the digital data, executing the computer readable instructions causing the computerized apparatus to record at least a portion of the authorization in the computerized apparatus, and grant a first access to the digital data based on the authorization;
wherein the recording of the at least portion of the authorization in the computerized apparatus enables subsequent execution of the computer readable instructions, said subsequent execution causing the computerized apparatus to grant a second access to the digital data automatically based at least in part on receiving at least a second request for access to the digital data, the second access not requiring contact with the party authorized to grant access to the digital data.

17. The method of claim 16, wherein:
the recordation of the digital data and the recording computer readable instructions is performed by a first party; and
the second request is received from a second party, the second party being different from the first party.

18. The method of claim 16, wherein:
the recordation of the digital data and the recording computer readable instructions is performed by a first party; and
the first request is received from a second party, the second party being different from the first party.

19. The method of claim 16, wherein:
contacting the party authorized to grant access to the digital data comprises accessing a network connection; and
the digital data comprises a software application configurable to operate independently of a continued access to the network connection.

20. The method of claim 19, wherein the recordation of the software application and the recording computer readable instructions are each performed during manufacture of the computerized apparatus.

21. The method of claim 19, wherein the recordation of the software application and the recording computer readable instructions are each performed based at least on a sale of the software application.

22. The method of claim 19, wherein the authorization to grant access to the digital data is based at least in part on verifying a permission of the computerized apparatus to access the software application.

23. The method of claim 19, wherein the software application is selected from the group consisting of: (i) a word processing application, (ii) a spreadsheet application, (iii) a gaming application, and (iv) an Internet access application.

24. The method of claim 16 wherein the recordation of the digital data and the computer readable instructions are each performed based at least in part on a purchase request for the computerized apparatus.

25. A method of distributing a software application with a computerized apparatus, the method comprising:
recording the software application on a non-volatile storage device in the computerized apparatus by a first entity;
recording a plurality of computer readable instructions in the computerized apparatus by the first entity; and
arranging for a transfer of the computerized apparatus to a second entity;
wherein the plurality of instructions are configured to enable automated control of access to the software application by at least:
based at least in part on receiving a first request to run the software application from the second entity, causing the computerized apparatus to contact via a network a party authorized to grant access to the software application;
receiving authorization to grant access to the software application;
causing the computerized apparatus to record at least a portion of the received authorization in the computerized apparatus, and grant access to the software application based at least in part on the authorization; and
in response to receiving at least a second request from the second entity to run the software application, causing the computerized apparatus to grant another access to the software application based on the authorization recorded in the computerized apparatus, said another access being granted without requiring further contact with the party.

26. The method of claim 25, wherein the recording the software application is performed by the first entity based at least in part on a sale of the software application to the second entity.

27. The method of claim 25, wherein the recording the software application is performed by the first entity based at least in part on a sale of the computerized apparatus to the second entity.

28. The method of claim 25, wherein the recording of the software application and the recording of the computer readable instructions are each performed during manufacture of the computerized apparatus.

29. The method of claim 25, wherein the party provides the authorization to grant access to the digital data based at least in part on verifying a permission of the computerized apparatus to access the software application.

30. The method of claim 25, wherein the software application is selected from group consisting of: (i) a word processing application, (ii) a spreadsheet application and (iii) a gaming application.

31. The method of claim 25, wherein the storage device comprises a removable medium.

32. The method of claim 25, wherein the storage device comprises a hard disk drive.

33. The method of claim 25, wherein the storage device comprises a programmable memory.

34. A method of controlling access to digitally rendered information in a computerized apparatus, the method comprising:
    recording the digitally rendered information on at least one non-volatile storage medium of the computerized apparatus by a first entity;
    recording computer readable instructions in the computerized apparatus; and
    controlling access to the digitally rendered information by at least:
        based at least in part on detecting an attempted use of the digitally rendered information by a second entity, causing automatic execution of the computer readable instructions adapted to (i) access a network link, and (ii) to contact a party authorized to grant access to the digitally rendered information;
        when the party provides an authorization to grant access to the digitally rendered information, cause recording of the authorization in the computerized apparatus, and causing granting of a first access to use the digitally rendered information based at least in part on the recorded authorization; and
        based at least in part on receiving a second request from the second entity to access the digitally rendered information, granting at least a second access to use the digitally rendered information based at least in part on the authorization recorded in the computerized apparatus, and without further contact with the party.

35. The method of claim 34, wherein the digitally rendered information comprises a software application configurable for stand-alone operation without relying on continued access to the network link.

36. The method of claim 34, wherein the digitally rendered information comprise a software application, and the recording of the application is performed based at least in part on a purchase of the software application by the second entity.

37. The method of claim 36, wherein the software application is configurable for stand-alone operation without relying on continued access to the network link.

38. The method of claim 36, wherein the recording of the digitally rendered information is performed by the first entity during manufacture of the computerized apparatus pursuant to a sale of the computerized apparatus.

39. The method of claim 36, wherein said providing an authorization to grant access to the digital data comprises authenticating the second entity for access the software application.

40. The method of claim 36, wherein said providing an authorization to grant access to the software application comprises authenticating the computerized apparatus for access to the software application.

41. The method of claim 40, wherein said authenticating is effected via the network link.

* * * * *